US006975926B2

(12) United States Patent
Schanin (10) Patent No.: US 6,975,926 B2
(45) Date of Patent: Dec. 13, 2005

(54) METHOD AND APPARATUS FOR POWER MANAGEMENT CONTROL OF A COMPRESSOR-BASED APPLIANCE THAT REDUCES ELECTRICAL POWER CONSUMPTION OF AN APPLIANCE

(75) Inventor: David J. Schanin, Denver, CO (US)

(73) Assignee: USA Technologies, Inc., Malvern, PA (US)

( * ) Notice: Subject to any disclaimer, the term of this patent is extended or adjusted under 35 U.S.C. 154(b) by 214 days.

(21) Appl. No.: 10/291,066

(22) Filed: Nov. 8, 2002

(65) Prior Publication Data

US 2004/0093125 A1 May 13, 2004

(51) Int. Cl.⁷ ............................................. G05D 23/00
(52) U.S. Cl. .................... 700/296; 700/276; 236/46 R; 62/157
(58) Field of Search .............................. 700/275–278, 700/286, 291, 295, 296; 236/46 R, 47; 221/150 R; 62/157, 158, 161, 231

(56) References Cited

U.S. PATENT DOCUMENTS

| | | | |
|---|---|---|---|
| 4,417,450 A | 11/1983 | Morgan, Jr. et al. ........... 62/126 |
| 4,448,346 A | 5/1984 | Kuwaki et al. ................ 236/46 |
| 4,752,853 A | 6/1988 | Matsko et al. ................... 36/94 |
| 5,475,609 A | 12/1995 | Apothaker .................... 700/292 |
| 5,574,653 A | 11/1996 | Coomer et al. ............... 700/286 |
| 5,625,236 A | 4/1997 | Lefebvre et al. ............... 307/41 |
| 5,673,202 A * | 9/1997 | Baldenweg et al. ......... 700/295 |
| 5,675,503 A * | 10/1997 | Moe et al. .................... 700/296 |
| 5,696,695 A | 12/1997 | Ehlers et al. ................ 700/286 |
| 5,739,596 A | 4/1998 | Takizawa et al. .............. 307/66 |
| 5,761,083 A | 6/1998 | Brown, Jr. et al. .......... 700/296 |
| 5,943,246 A | 8/1999 | Porter .......................... 307/43 |
| 5,962,989 A | 10/1999 | Baker ......................... 315/294 |
| 6,104,968 A | 8/2000 | Ananth ........................ 700/297 |
| 6,112,135 A | 8/2000 | Peterson et al. ............. 700/293 |
| 6,243,626 B1 | 6/2001 | Schanin ....................... 700/286 |
| 6,389,822 B1 | 5/2002 | Schanin .......................... 62/89 |
| 6,409,090 B1 * | 6/2002 | Gilvar et al. .............. 236/46 R |
| 6,745,581 B2 * | 6/2004 | King et al. ..................... 236/47 |
| 2004/0064218 A1 * | 4/2004 | Schanin et al. .............. 700/286 |

* cited by examiner

Primary Examiner—Albert W. Paladini
Assistant Examiner—Steven R. Garland
(74) Attorney, Agent, or Firm—RatnerPrestia (57) ABSTRACT

Power-management control methods and apparatus are disclosed. Power-management control is achieved by monitoring operational characteristics (such as current, compressor relay control signals, internal temperature) of an appliance during an extended period of operation, analyzing such operational characteristics to derive a characteristic cycle time of the cooling system of the appliance, and automatically decoupling the appliance from a power source in response to control signals provided by sensor(s). The appliance may be automatically coupled to the power source after expiration of a shutdown time period, which is automatically adjusted by the power management control system based upon the characteristic cycle time of the cooling system.

43 Claims, 4 Drawing Sheets

METHOD AND APPARATUS FOR POWER MANAGEMENT CONTROL OF A COMPRESSOR-BASED APPLIANCE THAT REDUCES ELECTRICAL POWER CONSUMPTION OF AN APPLIANCE

BACKGROUND OF THE INVENTION

1. Field of the Invention

The present invention relates to electrical systems and, more particularly, to electrical systems for reducing power consumption by electrical appliances.

2. State of the Art

Recent events have given urgency to what has always been a good idea: energy conservation. Energy conservation can be implemented simply by turning off power from appliances that are not in use. While power control can be done manually, e.g., people can turn off appliances when they are done using them and turn off lights as they leave a room, automated power control plays an important role in energy conservation.

Timers can be used to control power delivery. For example, business lights can be turned on automatically at the start of a business day and turned off automatically at its close. Alternatively, timers can control the duration for which an appliance is active. For example, a timer might turn off a hot air hand dryer after a fixed time; anyone wanting more time can reset the hand dryer. Many appliances, such a printers, enter a low-power "sleep" mode after a set period of non-use.

Ambient-light sensors can be used to control certain appliances. For example, street lamps can be activated in low light conditions, and deactivated when morning brings sufficient light that the artificial illumination is not required.

Motion sensors, such as occupancy sensors, can be used to supply power only when people are present. Security lights often combine ambient-light detection and motion detection. During the day, the lights remain off regardless of motion in their vicinity; however, at night, motion triggers the lights on.

Vending machines, particularly those that are refrigerated, pose special problems when it comes to energy conservation. Typically, a vending machine owner-operator places a vending machine in operation on the premises of another, and visits as necessary to refill the vending machine. The owner of the premises typically pays for the electricity consumed by the vending machine, and thus may have the biggest interest in saving power; however, the premises owner may be limited to unplugging the vending machine to save power during time of low usage.

However, unplugging or switching off a refrigerated vending machine can have the undesirable consequence that the vending items may warm up. In extreme cases, this may cause items to spoil as some artificial sweeteners in diet drinks cannot survive continual thermal cycling. However, even where spoilage is not a problem, customers might have the unpleasant experience of, for example, a warm soda if they purchase soon after the vending machine is turned on. Also, the product container may be wet due to condensation on warmup. Also, unplugging or switching off a vending machine risks losing sales and customers.

U.S. Pat. No. 6,243,626, commonly assigned to the assignee of the present invention, herein incorporated by reference in its entirety, discloses an appliance (e.g., vending machine) with an external power-management control subsystem that automatically couples/decouples the appliance to/from an electric power source (e.g., wall outlet) in response to control signals provided by one or more sensors/timing circuits. For example, a current sensor, time-of-day circuitry, an occupancy motion sensor, and timer circuitry can be used as inputs to a controller, which is programmed to automatically decouple the appliance from the wall outlet as follows. When the current level sensed by the current sensor is below a low threshold level, the occupancy motion sensor does not sense occupancy, and the time-of-day circuitry indicates the time is "off-hours", the timer is set to a predetermined probationary period (for example, ½ hour). During this probationary period, the inputs values are periodically evaluated to determine whether shutdown is appropriate. During such periodic evaluations, if shutdown is determined not to be appropriate, the probationary period is aborted. Yet, if during such evaluations, it is determined that shutdown is appropriate and the probationary period lapses, the controller automatically decouples the appliance from the wall outlet, thereby "shutting down" the appliance.

These same inputs (and other inputs) can be used by the controller to automatically couple the appliance to the wall outlet, thereby activating the appliance. For example, any one of the following conditions can trigger the controller to automatically couple the appliance to the wall outlet: lapse of a countdown period provided by the timing circuitry; the occupancy motion sensor senses occupancy; the time-of-day circuitry indicates the time is "in-business-hours"; a temperature sensor indicates the ambient temperature level has risen to a level that requires cooling/activation of the appliance.

Refrigerated vending machines utilize a compressor for cooling. It has been observed by the inventor hereof from extensive field measurements that the compressors in coin-operated beverage vending machines operate in a fairly consistent manner. In nearly all cases, the compressor will cycle from four to six times per hour. Exceptions do occur, such as when the machine is reloaded with hot product in summer. Typically, such events are transient and once the product is cooled down, the compressor operations resume to four to six cycles per hour.

However, it has been observed by the inventor hereof that the compressor operations in glass front, consumer accessible beverage coolers varies broadly. The trade names for such beverage coolers are reach-in coolers, slide coolers, or visi-coolers. More specifically, it has been observed by the inventor hereof that the compressor cycling for a representative array of commercially available reach-in coolers vary from a minimum cycle time of eight minutes to a maximum cycle time of eleven hours. This extreme range of compressor cycle times can be attributed to the following factors:

doors on some of these machines do not close properly, which causes leakage of cool air and extended compressor run time;

glass front doors, even if operating properly, are much less energy efficient than the steel, insulated interior doors used in coin-operated beverage machines; and poor maintenance leads to clogged compressor coils and increased compressor run time.

Poor maintenance occurs from the fact that service calls to reach-in coolers generally occur only when the cooling systems completely fail, which is rare. In contrast, coin-operated beverage vending machines are typically better maintained because such machines require service calls more often due to their complex coin, mechanical vending, and electronic subsystems.

In such reach-in coolers (and other compressor-based appliances that have broadly varying compressor cycles), automatic power management control is difficult. More specifically, when the appliance is decoupled from its power source, it is difficult to determine when to recouple the appliance to its power source. The time period between the decoupling and recoupling of the appliance to the power source is referred to herein as the "shutdown time period." This shutdown time period should be maximized for maximum energy saving.

Thus, there remains a need in the art for automatic power-management control of a reach-in cooler (and other compressor-based appliances that have broadly varying compressor cycles) that provides enhanced power conservation.

SUMMARY OF THE INVENTION

It is therefore an object of the invention to conserve energy usage by compressor-based appliances (such as a reach-in coolers) that experience a large range of cooling system cycle times.

It is another object of the invention to provide enhanced power-management control of compressor-based appliances (such as a reach-in coolers) that experience a large range of cooling system cycle times.

In accord with these objects, which will be discussed in detail below, an apparatus for and method of power-management control monitors operational characteristics (such as current, compressor relay control signals, temperature) of an appliance during an extended period of operation, and analyzes such operational characteristics to derive a characteristic cycle time of the cooling system of the appliance. The power input port of the appliance is automatically decoupled from a power source in response to control signals provided by sensor(s) and possibly in response to additional control signals. When a predetermined set of conditions are satisfied, the power input port of the appliance is automatically coupled to the power source after expiration of a shutdown time period, which is automatically adjusted by the power management control system based upon the characteristic cycle time of the cooling system and possibly other control signals (such as an ambient temperature level provided by a temperature sensor).

The apparatus for and method of power-management may be integral to an appliance. In this configuration, electrical components of the appliance (including the cooling system and possibly other electrical subsystems) are coupled/decoupled to/from the power source by the power-management control system in response to control signal provided thereto.

According to one embodiment of the present invention, the characteristic cycle time is derived by:

i) analyzing the current levels drawn by the appliance to derive a high threshold current value whereby any current level above the high threshold current level provides an indication that the cooling system of the appliance is activated/ON;

ii) analyzing the current levels drawn by the appliance to derive a low threshold current value whereby any current level below the low threshold current level provides an indication that the cooling system of the appliance is deactivated/OFF;

iii) analyzing the current levels drawn by the appliance to record duration of ON time periods during which the current level drawn by the appliance is above the high threshold current;

iv) analyzing the current levels drawn by the appliance to record duration of OFF time periods during which the current level drawn by the appliance is below the low threshold current;

v) using the ON and OFF time period durations (for example, by adding the average ON time period duration to the average OFF time period duration) to generate the characteristic cycle time.

According to other embodiments of the present invention, the cycling of the cooling system (and the characteristic cycle time of the cooling system based thereon) is identified by monitoring control signals that open and close a relay that selectively activates and deactivates the compressor of the cooling system, or by monitoring temperature (such as differential temperature across a condenser of the cooling system) within the appliance.

These features enable the power-management control methodology and subsystem to automatically maximize the shutdown time period for appliances that experience large range of cooling system cycle times (such as reach-in coolers), and thus provide for maximal power conservation for such appliances.

Additional objects and advantages of the invention will become apparent to those skilled in the art upon reference to the detailed description taken in conjunction with the provided figures.

DESCRIPTION OF THE PREFERRED EMBODIMENTS

Figure 1:
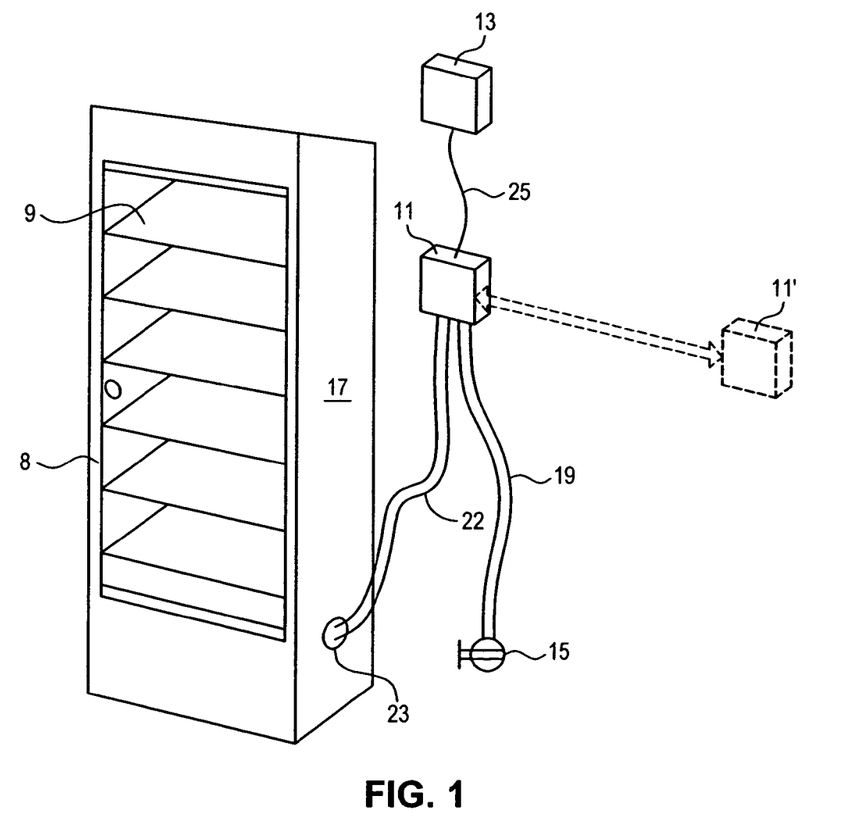
FIG. 1 is a perspective view of an exemplary embodiment of an external power-management control system 1 that controls the coupling of an appliance to a power source in accordance with the present invention.

Turning now to FIG. 1, a power-management control subsystem 11 and at least one sensor 13 (one shown) cooperate to automatically manage supply of power from an electric power source 15 (e.g., wall outlet as shown) to an appliance machine 17. Power cord 19 electrically couples the power-management control subsystem 11 to the power source 15, and power cord 22 electrically couples the power-management control subsystem 11 to the power input port 23 of the appliance machine 17. The output of the sensor(s) 13 is operably coupled to the power-management control subsystem 11 preferably via wiring 25 as shown. Alternately, a wireless data communication link may be used to couple the output of the sensor(s) 13 to the power-management control subsystem 11.

The power-management control subsystem 11, which may be external to the appliance machine 17 as shown, automatically couples/decouples the power input port 23 of the appliance machine 17 to/from the power source 15 in response to control signals provided by sensor(s) 13 (and possibly in response to additional control signals, for example provided by timing circuitry, time-of-day circuitry, and a current sensor as described hereinafter in detail). The sensor(s) 13 may include a motion-based occupancy sensor (preferably realized as a passive infrared motion detector) that senses occupancy in or near the area adjacent the appliance vending machine 17 and/or a temperature sensor that senses ambient temperature. In the configuration shown in FIG. 1, the power-management control subsystem 11 and the sensor(s) 13 are preferably mounted on a support member that is releasably affixed to the appliance machine 17 as described in detail in U.S. patent application Ser. No. 10/259,068, herein incorporated by reference in its entirety. In alternate embodiments (not shown), the power-management control subsystem 11 and possibly the sensor(s) 13 may be fastened to a wall structure adjacent the appliance machine 17.

Figure 4:
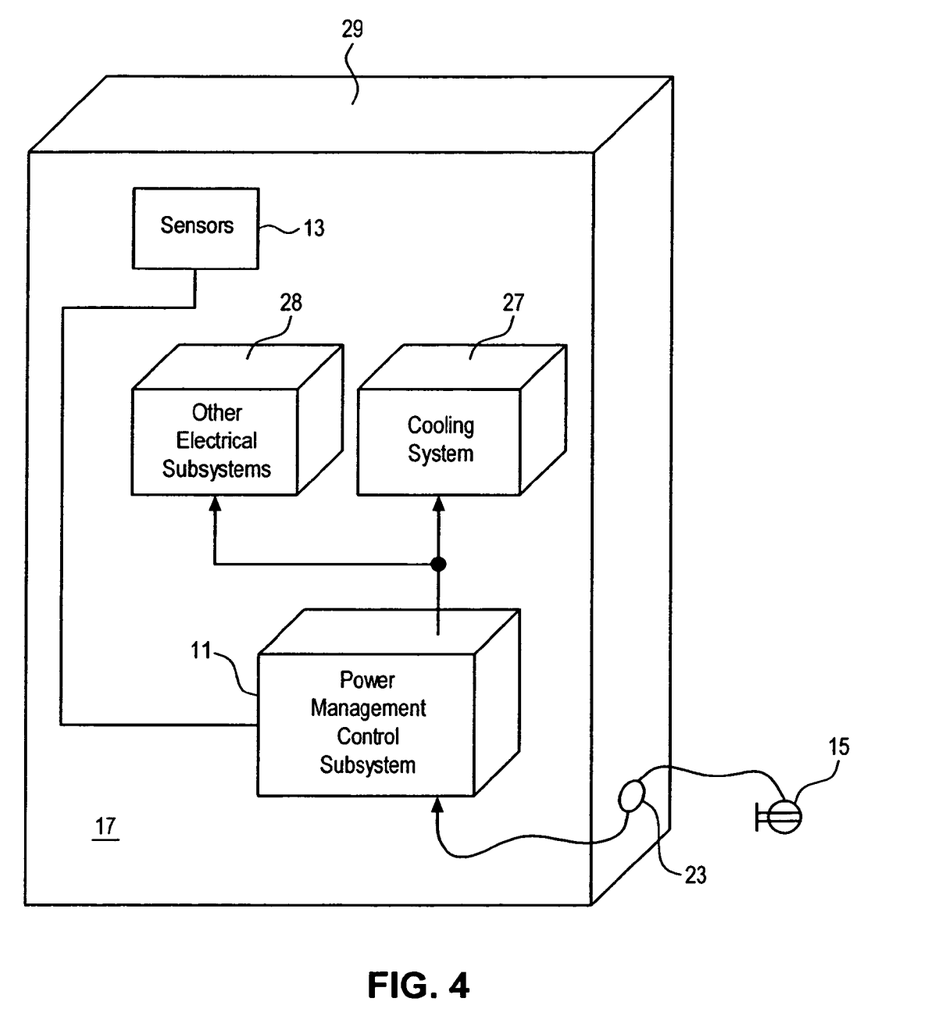
FIG. 4 is a schematic illustration of an exemplary appliance with the power-management control subsystem of FIG. 2 integrated therein in accordance with the present invention.

In an alternate embodiment shown in FIG. 4, the power-management control subsystem 11 and possibly the sensor (s) 13 are integral to the appliance machine 17. In such a configuration, the power-management control subsystem 11 and cooling system 27 of the appliance 17 are disposed within a common system housing 29 as shown, and the power-management control subsystem 11 manages supply of power to the cooling system 27 (and possibly to other electric systems 28 of the appliance) utilizing the power management operations described herein.

The power-management control subsystem 11 may be adapted to act as a master controller by forwarding sensor status information (derived from the output of the sensor(s) 13) to other power-management control subsystems 11' (slave controller(s)) operably coupled thereto as shown in FIG. 1, which is typically found in applications where a bank of vending machines are co-located in a facility. Preferably, the master power-management control subsystem 11 forwards such sensor status information by asserting a signal which is then electrically isolated, typically using an optcoupler, before connection to the slave power management control system(s) 11'. Isolating this signal eliminates voltage differences between the master and slave power-management control subsystems, which may occur in the event that the two subsystems are plugged into outlets on separate electrical circuits. Repeating the sensor status information from the master power-management control subsystem 11 to the slave power-management control subsystem(s) 11' allows each slave power-management control subsystem 11' to automatically manage supply of power from an electric power source to an appliance machine(s) operably coupled thereto without the need for sensors, thereby reducing the cost of the overall power management control system. Also, this repeating function allows the master power-management control subsystem 11 to delay the sending of such sensor status information for a small time period (e.g., few seconds) so that when occupancy is detected, the bank of appliance machines controlled by the chain of power-management control subsystems will power up sequentially and not in unison. Sequential power-up prevents electrical surges that might trip circuit protection devices such as circuit breakers.

Figure 2:
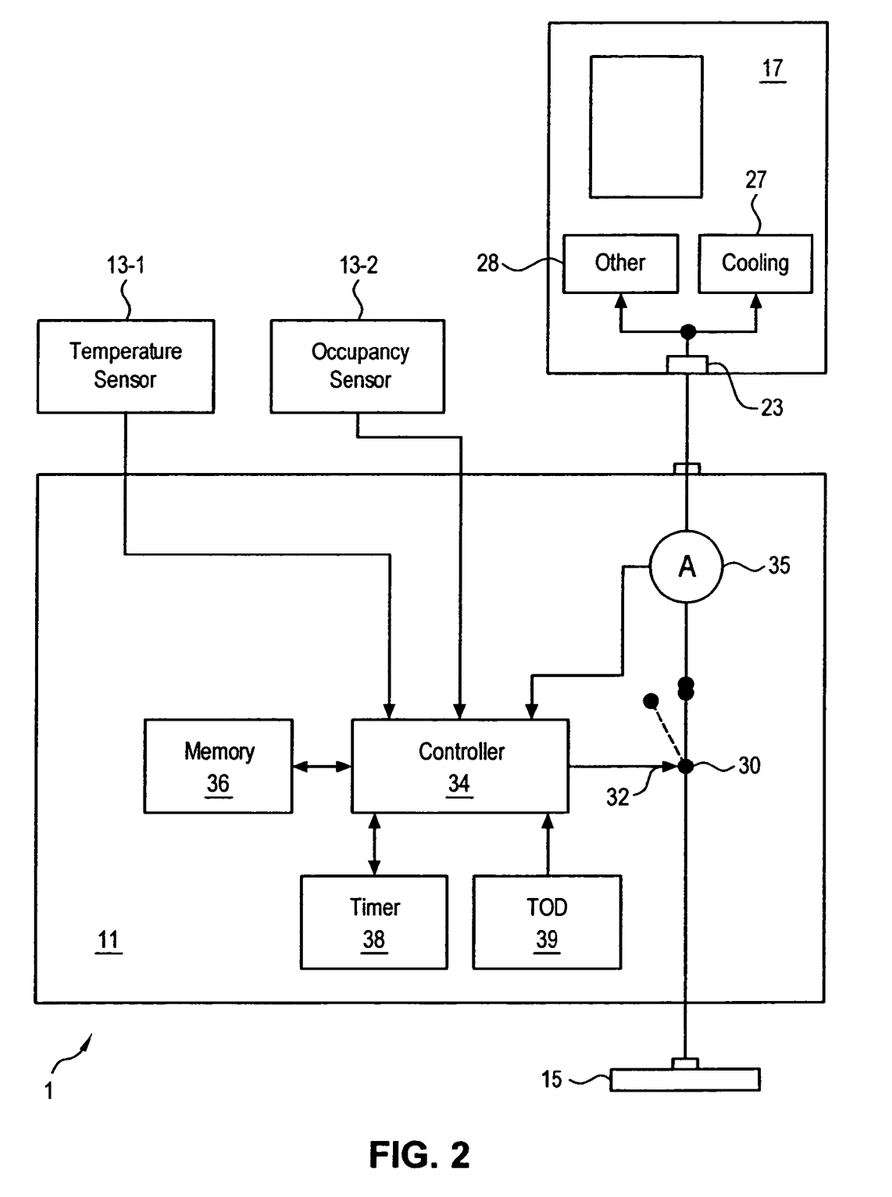
FIG. 2 is a schematic illustration of an exemplary power-management control system in accordance with the present invention.

FIG. 2 is a schematic diagram of an exemplary power-management control system 1. The power-management control subsystem 11 is disposed electrically between an electrical power source (e.g., wall socket) 15 and an appliance machine 17. The subsystem 11 includes a switch 30 that, when in its "ON" condition, electrically couples the input power port 23 of the appliance machine 17 to wall socket 15. In its "OFF" condition, indicated in phantom in FIG. 2, switch 30 causes the input power port 23 of the appliance machine 17 to be decoupled electrically from the power source 15.

Power switch 30 has a control input 32 that is coupled to a controller 34. Through its connection to control input 32, controller 34 controls when switch 30 is in its ON condition and when it is in its OFF condition. Controller 34 determines the appropriate condition for switch 30 at any given time as a function of present and past readings from a current sensor 35, a temperature sensor 13-1, an occupancy sensor 13-2, and a time-of-day circuit 39 (an absolute time sensor). In addition, subsystem 11 includes a timer 38 for elapsed time indications and a random-access memory 36 for storing data for use by controller 34. Thus, each of these devices is coupled to the controller 34 so as to provide respective parameter readings thereto.

Alternative embodiments of the invention omit one or more of the current sensor 35, the temperature sensor 18, the occupancy sensor 20, and the time-of-day circuit 39. Also, some embodiments include a time-of-day circuit 39 that is used to provide data from which a controller calculates elapsed time, thus dispensing with the need for a separate timer circuit 38.

The appliance machine 17 may be a glass front, consumer accessible beverage cooler (sometimes referred to as a reach-in cooler, slide cooler or visi-cooler) that includes a glass door 8 and a plurality of shelves 9 as shown in FIG. 1. The shelves 9 support beverage containers (not shown) that are all visible and therefore available for access by customers. Alternatively, the appliance machine 17 may be another appliance that exhibits a large range of cooling system cycle times.

Figure 3:
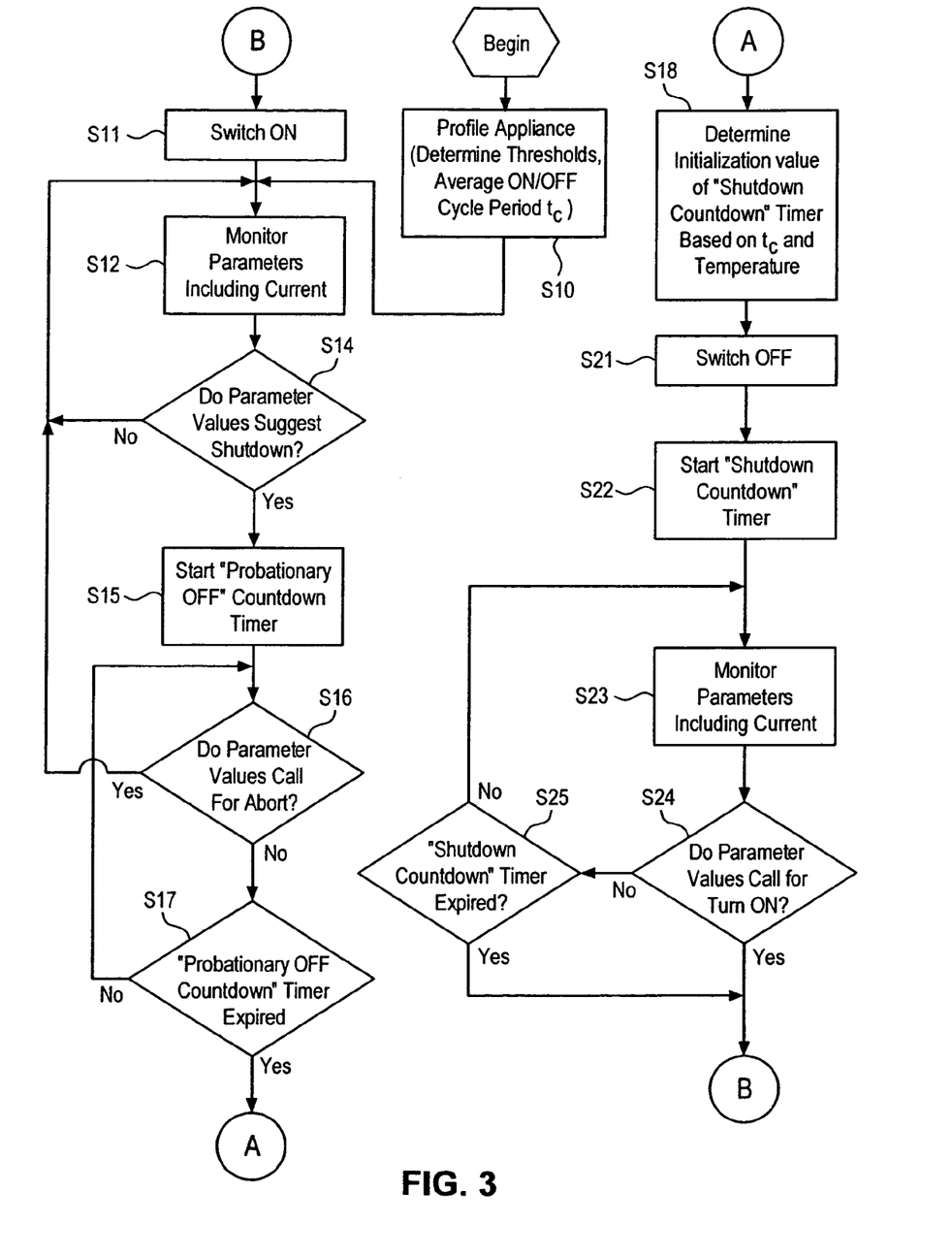
FIG. 3 is a flow chart of an exemplary power-management control scheme carried out by the power-management control system of FIG. 2.

FIG. 3 is a flow chart illustrating an exemplary power-management control scheme carried out by the power-management control system 1 of FIG. 2. The control operations begin in block S10 where data is collected and is used to build a profile of appliance machine 17, which is stored in memory 36. This profile includes the characteristic cycle time ($t_c$) of the cooling system of the appliance machine 17. For example, minima and maxima of the current levels drawn by the appliance machine 17 (measured by current sensor 35) are recorded and stored by controller 34 in memory 36. Current thresholds are calculated by controller 34 as a function of the minima and maxima current levels and are also stored in memory 36. Such current thresholds preferably include a high threshold current level that provides an indication that the cooling system of the appliance is activated/ON, and a low threshold current value that provides an indication that the cooling system of the appliance is deactivated/OFF. Between the high and low threshold current levels is an indeterminate or transition range that can be used to introduce hysteresis into the determination of when to remove power from the appliance vending machine 17. In addition, the controller 34 preferably calculates durations of ON time periods during which the current level drawn by the appliance is above the high threshold current in addition to durations of the OFF time periods during which the current level drawn by the appliance is below the low threshold current, and stores the durations of such ON time periods and the durations of such OFF time periods in memory 36. The controller 34 calculates the characteristic cycle time ($t_c$) of the cooling system of the appliance machine 17 as a function of such ON time period durations and OFF time period durations (for example, by adding the average ON time period duration to the average OFF time period duration), and stores the characteristic cycle time ($t_c$) in memory 36. During the appliance profiling operations of block S10, the switch 30 is placed in its ON condition so that power is supplied from power source 15 to the appliance machine 17. In addition, the duration of the profiling operations of block S10 is set for an extended period of time that encompasses at least one expected cycle time (and possibly one to twenty expected cycle times) of the cooling system of the appliance machine 17. For glass front, consumer accessible beverage cooler appliances, this extended period of time is typically on the order of 12 to 48 hours, such as a 24 hour time period. In this manner, the profiling operations of block S10 build an accurate estimate of the characteristic cycle time of the cooling system of the appliance machine 17.

Alternatively, in the profiling operations of block S10, the cycling of the cooling system of the appliance may be identified by monitoring control signals that open and close a relay that selectively activates and deactivates the compressor of the cooling system, or by monitoring temperature (such as differential temperature across a condenser of the cooling system) within the appliance. In this configuration, the characteristic cycle time of the cooling system is based upon the time durations of the cycle(s) of the cooling system during the extended time period of the profiling operations of block S10.

After profiling is accomplished at block S10, the operations of the power management control scheme continue to block S12. Note that the operations of block S11 (wherein the switch 30 is placed in its ON condition so that power is supplied from power source 15 to the appliance machine 17) are bypassed because the switch 30 has already been placed in its ON condition during the profiling operations of block S10.

In block S12, current, temperature, occupancy, and absolute time parameters are monitored. The monitoring is ongoing even as subsequent blocks are performed.

In blocks S14 through S17, parameters monitored in block S12 are used to determine whether to maintain switch 30 in the ON condition or switch it into the OFF condition (thereby shutting down the appliance machine 17). In particular, in block S14, it is determined whether the parameters indicate that the switch 30 should be maintained in the ON condition or switched into the OFF condition (thereby shutting down the appliance machine 17). For example, if the current level identified by current sensor 35 is high (indicated usage or a compressor cycle), if the occupancy sensor 13-2 determines that occupancy is positive, or if the absolute time provided by time-of-day circuit 39 is during "business hours", the appliance machine 17 is not shut down. In this case, operations return to the monitoring block S12. However, if the current level identified by current sensor 35 is below the low threshold, the occupancy sensor 13-2 determines that occupancy is negative, and the absolute time provided by time-of-day circuit 39 is during "off hours", then the timer 38 is set for a probationary period (e.g., half an hour time period) at block S15.

During this probationary period (blocks S16, S17), the present values of the parameters are evaluated repetitively to determine whether any parameter changes to a value which would indicate that shut down is not appropriate. If there is such a change, the countdown is aborted and operations return to monitoring in block S12. More specifically, if the current exceeds the upper threshold, occupancy becomes positive, or the time-of-day becomes "business hours", the probationary countdown is aborted. If the parameter values remain within the range for which shut down is appropriate and the end of "probationary" countdown period is detected in block S17, the operations continue at block S18.

In block S18, the controller 34 calculates a shutdown time period (that will be used to initialize the timer 38 in block S22) as a function of the characteristic cycle time ($t_c$) calculated in block S10 and possibly as a function of ambient temperature (as sensed by the temperature sensor 13-1). For example, the shutdown time period my be calculated by adding the characteristic cycle time ($t_c$) to an offset time period that is based on ambient temperature.

The control operations of block S18 continue to block S21, wherein the switch 30 is placed in its OFF condition so that the power source 15 is decoupled from the appliance machine 17, and operations continue to block S22. In block S22, timer 38 is set to the shutdown time period determined in block S18, and the operations continue at block S23. In block S23, parameters other than current are monitored. At block S24, if it is found that the parameter values call for activating the appliance machine 17, operations jump to block S11 and the switch 30 is set in its ON condition. Otherwise, operations continue to block S25.

In block S24, activation can be caused by:
  i) the occupancy sensor 13-2 providing an indication that occupancy is positive;
  ii) transition of the absolute time provided by time-of-day circuit 39 into "business hours"; or
  iii) an increase in temperature measured by temperature sensor 13-1 to an ambient temperature level requiring cooling of contents.

In block S25, if the expiration of the shutdown time period is detected, the operations jump to block S11 and the switch 30 is set in its ON condition. Otherwise, operations return to the monitoring operations of block S23.

By monitoring the operational characteristics (e.g., current compressor relay control signals, internal temperature) of the appliance over an extended period of time and building a profile of the appliance that includes the characteristic cycle time ($t_c$) of the cooling system of the appliance, the control scheme of FIG. 3 gathers and maintains information about the appliance that can permit more intelligent power-management. These features enable the power-management control subsystem to automatically maximize the shutdown time period for compressor-based appliances (such as a reach-in coolers) that experience a large range of cooling system cycle times, and thus provide for maximal power conservation for such appliances.

There have been described and illustrated herein several embodiments of a power-management control system and intelligent power control methodologies/schemes for use with beverage coolers. While particular embodiments of the invention have been described, it is not intended that the invention be limited thereto, as it is intended that the invention be as broad in scope as the art will allow and that the specification be read likewise. Thus, the invention applies more generally to other appliances, including those that vary the current they draw in accordance with internal activity. Most electro-mechanical appliances are in this category. Moreover, while particular configurations of control architectures and schemes have been disclosed, it will be appreciated that other configurations could be used as well. It will therefore be appreciated by those skilled in the art that yet other modifications could be made to the provided invention without deviating from its spirit and scope as claimed.

What is claimed is:

1. A method for managing electric power consumed by an appliance machine that includes a cooling system that operates in an active state and an inactive state, the method comprising:

a) monitoring operational characteristics of said appliance machine during an extended period of time to identify when said cooling system is operating in the active state and when said cooling system is operating in the inactive state, said operational characteristics include a differential temperature across a condenser of said cooling system within said appliance machine;

b) deriving a characteristic cycle time of said cooling system based upon said operational characteristics;

c) decoupling said appliance machine from its electric power source based upon a value of at least one of a first set of parameters; and d) coupling said appliance machine to its electric power source upon expiration of a shutdown time, said shutdown time based upon at least said characteristic cycle time.

2. A method for managing electric power consumed by an appliance machine according to claim 1, wherein:
said operational characteristics include current levels drawn by said appliance machine.

3. A method for managing electric power consumed by an appliance machine according to claim 2, wherein:
said monitoring includes identifying minima and maxima of current levels drawn by said appliance machine, and said characteristic cycle time is derived from said minima and maxima of current levels drawn by said appliance machine.

4. A method of managing electric power consumed by an appliance machine according to claim 3, wherein:
said monitoring includes identifying a high threshold current value and a low threshold current value, said high threshold current value providing an indication that said cooling system is operating in said active state and being derived from said maxima of current levels drawn by said appliance machine, and said low threshold current value providing an indication that said cooling system is operating in said inactive state and being derived from said minima of current levels drawn by said appliance machine, and wherein said characteristic cycle time is derived from said high threshold current value and said low threshold current value.

5. A method of managing electric power consumed by an appliance machine according to claim 4, wherein:
said monitoring includes identifying duration of ON time periods during which current level drawn by said appliance machine is above said high threshold current and identifying duration of OFF time periods during which current level drawn by said appliance machine is below said low threshold current, and wherein said characteristic cycle time is derived from duration of said ON time periods and duration of said OFF time periods.

6. A method of managing electric power consumed by an appliance machine according to claim 5, wherein:
said characteristic cycle time is derived from an average duration of said ON time periods and an average duration of said OFF time periods.

7. A method for managing electric power consumed by an appliance machine according to claim 1, wherein:
said operational characteristics include control signals that open and close a relay that selectively activates and deactivates a compressor of the cooling system.

8. A method for managing electric power consumed by an appliance machine according to claim 1, wherein:
said extended period of time encompasses between one and twenty expected cycle times of said cooling system.

9. A method of managing electric power consumed by an appliance machine according to claim 1, wherein:
said shutdown time is based upon an ambient temperature level sensed by a temperature sensor.

10. A method of managing electric power consumed by an appliance machine according to claim 1, wherein:
said first set of parameters is selected from the group consisting of: current level drawn by said appliance machine, occupancy sensed by an occupancy sensor, temperature sensed by a temperature sensor, and time-of-day provided by a time-of-day timer.

11. A method of managing electric power consumed by an appliance machine according to claim 1, further comprising:
e) coupling said appliance machine to its electric power source prior to expiration of said shutdown time based upon a value of at least one of a second set of parameters.

12. A method of managing electric power consumed by an appliance machine according to claim 11, wherein:
said second set of parameters is selected from the group consisting of: occupancy sensed by an occupancy sensor, temperature sensed by an temperature sensor, and time-of-day provided by a time-of-day timer.

13. A method of managing electric power consumed by an appliance machine according to claim 1, wherein:
said appliance machine comprises a glass front, consumer accessible beverage cooler.

14. A power-management control apparatus that automatically manages supply of electrical power from a power source to an appliance that includes a cooling system that operates in an active state and an inactive state, said apparatus comprising:
a) a switch that selectively couples and uncouples said power source to/from said appliance, said switch having a switch control input;
b) a controller, operably coupled to said switch control input, that is adapted to perform control operations that include
  i) monitoring operational characteristics of said appliance during an extended period of time to identify when said cooling system is operating in the active state and when said cooling system is operating in the inactive state, said operational characteristics include differential temperature across a condenser of said cooling system within said appliance,
  ii) deriving a characteristic cycle time of said cooling system based upon said operational characteristics,
  iii) controlling said switch via said switch control input to decouple said appliance from said power source based upon values of a first set of parameters, and
  iv) controlling said switch via said switch control input to couple said appliance to said power source upon expiration of a shutdown time, said shutdown time based upon at least said characteristic cycle time.

15. A power-management control apparatus according to claim 14, wherein:
said operational characteristics include current levels drawn by said appliance machine.

16. A power-management control apparatus according to claim 15, further comprising:
c) a current sensor, operably coupled to said controller, that provides said controller with signals representing said current levels.

17. A power-management control apparatus according to claim 15, wherein:
said monitoring includes identifying minima and maxima of current levels drawn by said appliance, and said characteristic cycle time is derived from said minima and maxima of current levels drawn by said appliance.

18. A power-management control apparatus according to claim 17, wherein:
said monitoring includes identifying a high threshold current value and a low threshold current value, said high threshold current value providing an indication that said cooling system is operating in the active state and being derived from said maxima of current levels drawn by said appliance, and said low threshold current value providing an indication that said cooling system is operating in the inactive state and being derived from said minima of current levels drawn by said appliance, and wherein said characteristic cycle time is derived from said high threshold current value and said low threshold current value.

19. A power-management control apparatus according to claim 18, wherein:
said monitoring includes identifying duration of ON time periods during which current level drawn by said appliance is above said high threshold current and identifying duration of OFF time periods during which current level drawn by said appliance is below said low threshold current, and wherein said characteristic cycle time is derived from duration of said ON time periods and duration of said OFF time periods.

20. A power-management control apparatus according to claim 19, wherein:
said characteristic cycle time is derived from an average duration of said ON time periods and an average duration of said OFF time periods.

21. A power-management control apparatus according to claim 14, wherein:
said operational characteristics include control signals that selectively open and close a relay that selectively activates and deactivates a compressor of the cooling system.

22. A power-management control apparatus according to claim 14, wherein:
said extended period of time encompasses between one and twenty expected cycle times of said cooling system.

23. A power-management control apparatus according to claim 14, further comprising:
d) a temperature sensor that senses ambient temperature, said temperature sensor operably coupled to said controller; and
wherein said shutdown time is based upon an ambient temperature sensed by said temperature sensor.

24. A power-management control apparatus according to claim 14, further comprising:
d) at least one of a current sensor, a temperature sensor, an occupancy sensor and a time-of-day timer, and
wherein said first set of parameters is selected from the group consisting of: current level drawn by said appliance sensed by said current sensor, occupancy sensed by an occupancy sensor, temperature sensed by said temperature sensor, and time-of-day provided by said time-of-day timer.

25. A power-management control apparatus according to claim 14, wherein:
said controller is adapted to perform control operations that control said switch via said switch control input to couple said appliance machine to said power source prior to expiration of said shutdown time based upon values of a second set of parameters.

26. A power-management control apparatus according to claim 25, further comprising:
d) at least one of a temperature sensor, an occupancy sensor and a time-of-day timer, and
wherein said second set of parameters is selected from the group consisting of: occupancy sensed by said occupancy sensor, temperature sensed by said temperature sensor, and time-of-day provided by said time-of-day timer.

27. A power-management control apparatus according to claim 14, wherein:
said appliance comprises a glass front, consumer accessible beverage cooler.

28. A power-management control apparatus according to claim 14, wherein:
said power-management control apparatus is external to said appliance machine.

29. A power-management control apparatus according to claim 14, wherein:
said power-management control apparatus is integral to said appliance machine.

30. An appliance that draws electrical power from a power source, said appliance comprising:
a) electrical components including a cooling system that operates in an active state and an inactive state; and
b) a power-management control subsystem that automatically manages supply of electrical power from said power source to said electrical components, said subsystem including
  i) a switch that selectively couples and uncouples said power source to/from said electrical components, said switch having a switch control input;
  ii) a controller, operably coupled to said switch control input, adapted to perform control operations that include
    monitoring operational characteristics of said appliance during an extended period of time to identify when said cooling system is operating in the active state and when said cooling system is operating in the inactive state,
    said operational characteristics include a temperature within said appliance and said temperature comprises differential temperature across a condenser of said cooling system,
    deriving a characteristic cycle time of said cooling system based upon said operational characteristics,
    controlling said switch via said switch control input to decouple said electrical components from said power source based upon values of a first set of parameters, and
    controlling said switch via said switch control input to couple said electrical components to said power source upon expiration of a shutdown time, said shutdown time based upon at least said characteristic cycle time.

31. An appliance according to claim 30, wherein:
said operational characteristics include current levels drawn by said appliance machine.

32. An appliance according to claim 31, further comprising:
a current sensor, operably coupled to said controller, that provides said controller with signals representing said current levels.

33. An appliance according to claim 31, wherein:
said monitoring includes identifying minima and maxima of current levels drawn by said appliance, and said characteristic cycle time is derived from said minima and maxima of current levels drawn by said appliance.

34. An appliance according to claim 33, wherein:

said monitoring includes identifying a high threshold current value and a low threshold current value, said high threshold current value providing an indication that said cooling system is operating in the active state and being derived from said maxima of current levels drawn by said appliance, and said low threshold current value providing an indication that said cooling system is operating in the inactive state and being derived from said minima of current levels drawn by said appliance, and wherein said characteristic cycle time is derived from said high threshold current value and said low threshold current value.

35. An appliance according to claim 34, wherein:

said monitoring includes identifying duration of ON time periods during which current level drawn by said appliance is above said high threshold current and identifying duration of OFF time periods during which current level drawn by said appliance is below said low threshold current, and wherein said characteristic cycle time is derived from duration of said ON time periods and duration of said OFF time periods.

36. An appliance according to claim 35, wherein:

said characteristic cycle time is derived from an average duration of said ON time periods and an average duration of said OFF time periods.

37. An appliance according to claim 30, wherein:

said operational characteristics include control signals that selectively open and close a relay that selectively activates and deactivates a compressor of the cooling system.

38. An appliance according to claim 30, wherein:

said extended period of time encompasses between one and twenty expected cycle times of said cooling system.

39. An appliance according to claim 30, further comprising:

at least one of a current sensor, a temperature sensor, an occupancy sensor and a time-of-day timer; and wherein said first set of parameters is selected from the group consisting of: current level output by said current sensor, occupancy sensed by an occupancy sensor, temperature sensed by said temperature sensor, and time-of-day provided by said time-of-day timer.

40. An appliance according to claim 39, wherein:

said controller is adapted to perform control operations that control said switch via said switch control input to couple said electrical components to said power source prior to expiration of said shutdown time based upon values of a second set of parameters.

41. An appliance according to claim 30, further comprising:

at least one of a temperature sensor, an occupancy sensor and a time-of-day timer, and wherein said second set of parameters is selected from the group consisting of:

occupancy sensed by said occupancy sensor, temperature sensed by said temperature sensor, and time-of-day provided by said time-of-day timer.

42. An appliance according to claim 30, wherein:

said appliance comprises a glass front, consumer accessible beverage cooler.

43. An appliance according to claim 30, wherein:

said electrical components and power management control subsystem are disposed within a common housing.

* * * * *